(12) United States Patent
Uno et al.

(10) Patent No.: US 6,547,947 B1
(45) Date of Patent: Apr. 15, 2003

(54) METHOD AND APPARATUS FOR WATER TREATMENT

(75) Inventors: Masaharu Uno, Kanagawa (JP); Shuhei Wakita, Kanagawa (JP); Shuji Nakamatsu, Kanagawa (JP); Yoshinori Nishiki, Kanagawa (JP)

(73) Assignee: Permelec Electrode Ltd., Kanagawa (JP)

( * ) Notice: Subject to any disclaimer, the term of this patent is extended or adjusted under 35 U.S.C. 154(b) by 0 days.

(21) Appl. No.: 09/526,061

(22) Filed: Mar. 15, 2000

(30) Foreign Application Priority Data

Mar. 15, 1999 (JP) .......................................... 11-067878

(51) Int. Cl.$^7$ ................................................. C02F 1/461
(52) U.S. Cl. ........................ 205/466; 205/746; 205/756; 204/263; 204/265; 204/266
(58) Field of Search ............................... 205/466, 746, 205/756; 204/263, 265, 266

(56) References Cited

U.S. PATENT DOCUMENTS 5,900,127 A * 5/1999 Iida et al. ................. 204/290 F
5,997,717 A * 12/1999 Miyashita et al. .......... 205/466

* cited by examiner

*Primary Examiner*—Arun S. Phasge
(74) *Attorney, Agent, or Firm*—Sughrue Mion, PLLC

(57) ABSTRACT

A method and apparatus for water treatment. The method comprises supplying an oxygen-containing gas to cathode 6 to yield hydrogen peroxide, supplying an inorganic acid to anode 5 through an acid solution addition opening 4 to yield an oxidation product, e.g., hypochlorous acid, and using both the hydrogen peroxide and oxidation product thus generated to treat a liquid to be treated. The atmosphere around the cathode surface is kept neutral to acidic due to the acidity of the coexisting oxidation product to thereby inhibit the deposition of metal hydroxides.

22 Claims, 3 Drawing Sheets

( Fig 1 )
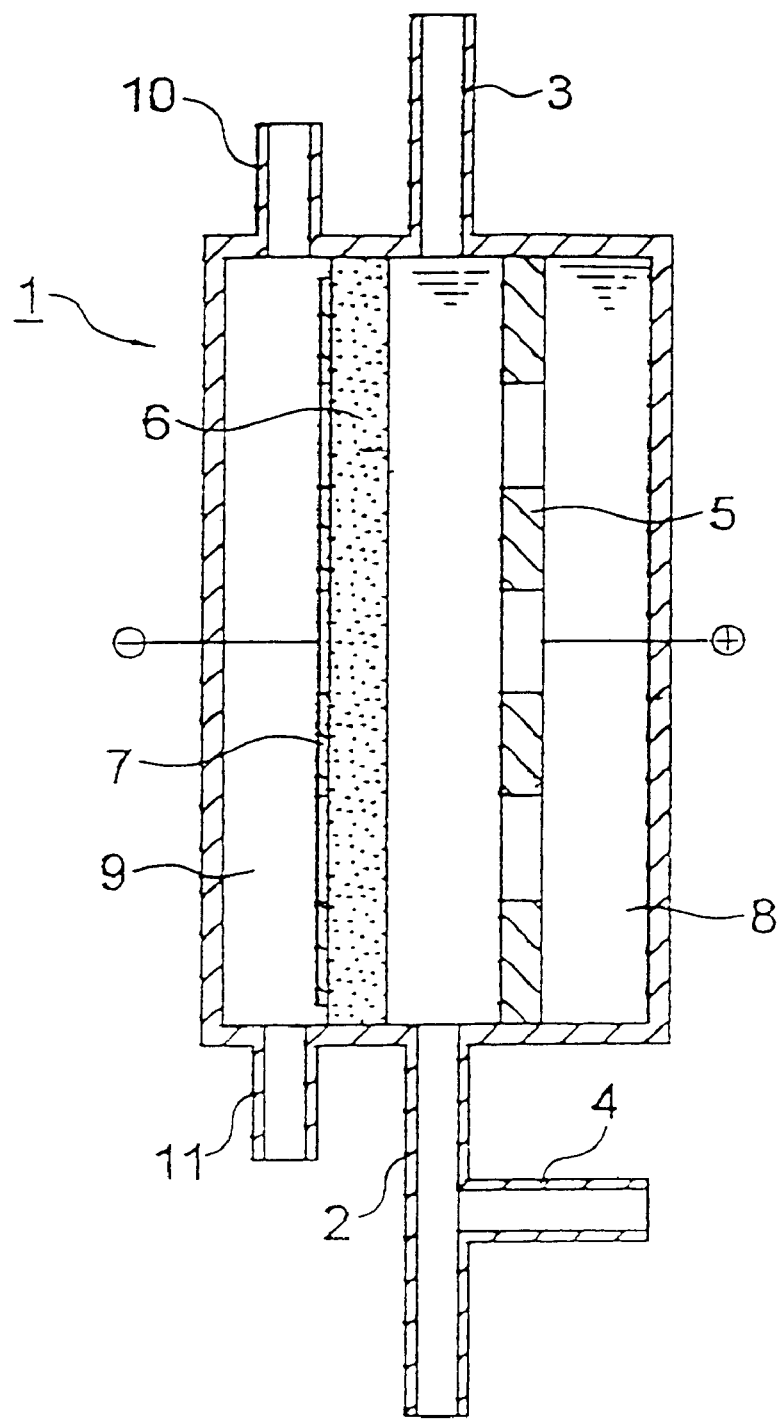

(Fig 2)
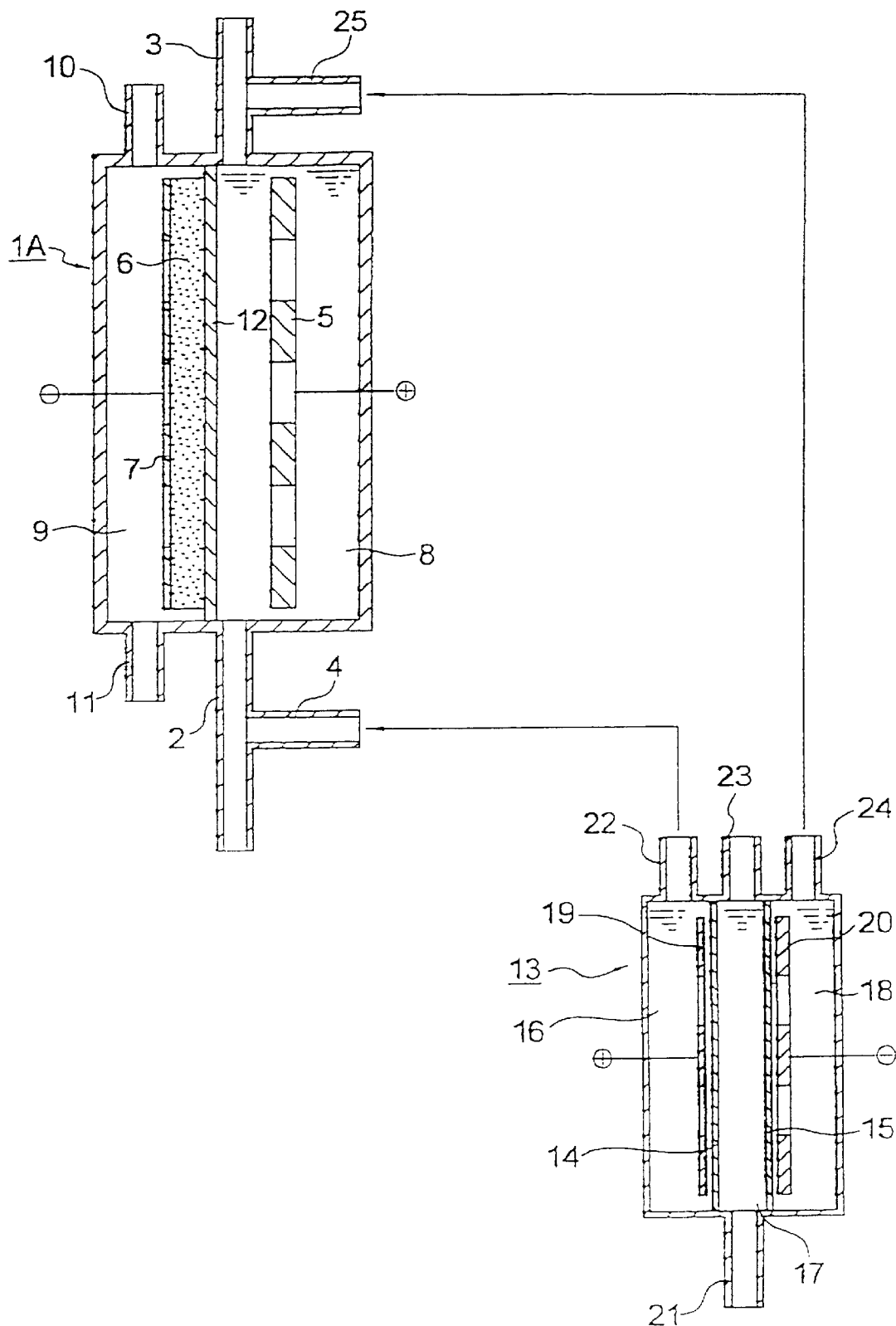

( Fig 3 )
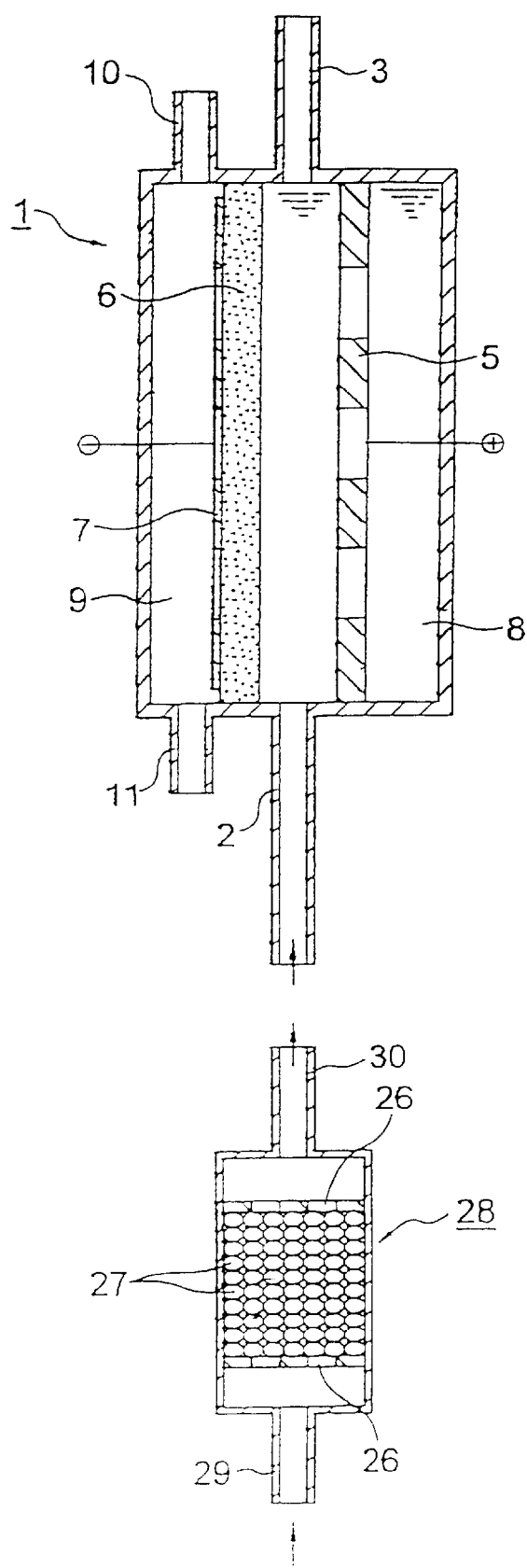

METHOD AND APPARATUS FOR WATER TREATMENT

FIELD OF THE INVENTION

The present invention relates to a method and apparatus for water treatment which can satisfactorily treat liquids and attain a heightened effect with respect to disinfection, etc.

DESCRIPTION OF THE RELATED ART

Industrial and household wastes cause air pollution, water pollution in rivers, lakes, and marshes, etc., and there is concern about the influence of these pollutants on the environment and the human body. There is an urgent need to take technical measures to overcome this problem. For example, in water treatment for drinking water production and in sewage treatment and wastewater treatment, chemicals including chlorine have been used for decolorization, reduction in COD, and disinfection. However, there is a tendency toward prohibiting the use of chlorine because the addition of a large amount of this chemical yields new dangerous substances, e.g., environmental hormones (exogenous endocrine disruptors) and carcinogenic substances. Furthermore, the incineration of wastes is regarded as problematic with respect to safety because the incineration generates combustion gases—which can contain carcinogenic substances (dioxins) depending on the combustion conditions and these substances influence the ecological system. Novel techniques for overcoming this problem are being investigated.

An electrolytic process has conventionally been used for wastewater treatment. In this process, clean electrical energy is utilized to conduct electrolysis while controlling chemical reactions on the electrode surfaces, whereby hydrogen, oxygen, ozone, hydrogen peroxide, etc., are generated to indirectly decompose a substance to be treated, or the substance is adsorbed onto one of the electrodes to directly decompose the same.

Oxidation reactions on the anode are known to yield oxidizing agents effective in water treatment (e.g., chlorine and ozone) and to further yield active substances such as OH radicals under some conditions. The resultant water is generally called active water, functional water, ionic water, bactericidal water, or the like (see Kyôsansei Denkaisui No Kisochishiki, Ohm-sha, Ltd.). Details of electrodes, substances to be reacted, etc., are given, e.g., in Denki Kagaku, Vol.62, 1084—(1992) and *Journal of Applied Electrochemistry,* Vol. 21, 104 (1991). These references point out that there are cases where a substance to be decomposed cannot be sufficiently decomposed depending on the electrode performance. In the electrolysis of an aqueous solution, the anodic oxidation reactions generally yield electrolysis products from the water. However, when an electrode catalyst which is highly reactive in electric discharge in water is used, there frequently are cases where the oxidation of other coexistent substances does not readily proceed. Examples of the material for electrodes where oxidation is conducted include lead oxide, tin oxide, platinum, DSA's and carbon, while examples of the material for electrodes where reduction is conducted include lead, iron, platinum, titanium and carbon. Materials for use as electrode bases must have corrosion resistance from the standpoints of long life and avoiding the pollutants of the liquid to be treated. Consequently, useful materials for anode feeders are limited to valve metals such as titanium and alloys of the valve metals. Electrode catalysts also are limited to noble metals such as platinum and iridium and oxides thereof. It is, however, known that even when such expensive materials are used at a given electric current, they are gradually consumed and dissolved in the solution with the lapse of time at a rate corresponding to the current density. Hence, there is a need for an electrode having better corrosion resistance.

On the other hand, the usual cathodic reaction is the reduction of water, which generates hydrogen. Hydrogen has reducing ability and has use value in some applications. However, hydrogen not only is insufficient in its ability to decompose organic substances present in water to be treated, but is dangerous because it may explode when present in concentrations within a certain range. When oxygen is present, the reduction reaction of the oxidizing gas proceeds preferentially as a cathodic reaction to yield hydrogen peroxide. The effect of electrolytic treatment due to contact with a liquid to be treated is expected in addition to direct electrolysis as described hereinabove. For example, the function of superoxide anions ($O_2^-$), which are one-electron reduction products having high activity, is expected. Hydrogen peroxide is useful as a basic chemical indispensable to the food, medicine, pulp, textile and semiconductor industries. Attention is focused especially on future applications of hydrogen peroxide, such as the cleaning of electronic parts and the sterilization of medical tools, apparatus, and equipment. Although synthesized by the anthraquinone process, hydrogen peroxide itself is unstable and cannot be stored over long periods. Hence, there is a growing for an on-site hydrogen peroxide production apparatus from the standpoints of the danger of transportation and pollution abatement. An electrolytic process is most suitable for this application.

*Journal of Applied Electrochemistry,* Vol.25, 613—(1995) compares various electrolytic processes for yielding hydrogen peroxide. In these processes, it is necessary to supply an alkali ingredient as a feed material because hydrogen peroxide in each process is efficiently obtained in an aqueous alkali solution. Namely, an aqueous solution of an alkali such as KOH or NaOH is indispensable. In *Journal of Electrochemical Society,* Vol.140, 1632—(1993) reports the decomposition of formaldehyde with electrolytic hydrogen peroxide. *Journal of Electrochemical Society,* Vol.141, 1174—(1994) proposes a technique in which pure water as a feed material is electrolyzed using an ion-exchange membrane to synthesize ozone and hydrogen peroxide on the anode and cathode, respectively. However, this technique has a low current efficiency and is hence impractical. Although it has been reported that these techniques, when practiced under a high pressure, attain a heightened efficiency of synthesis, such processes are still impractical from the standpoint of safety. Furthermore, an electrolytic process using a palladium foil has been proposed, but applications thereof are limited because the attainable concentrations are low and the process is costly. When water containing a large amount of metal ions, such as, e.g., tap water, well water, or seawater is to be treated, there are cases where a hydroxide deposits on the cathode surface. For preventing such deposits, an apparatus for diminishing the metal ions by means of electrodialysis, a reverse osmosis membrane, or the like is indispensable as a pretreatment step, and it is necessary to periodically conduct cleaning or the like by feeding an acid. Namely, the management of chemicals is troublesome.

In the electrolysis of tap water, well water, or the like, the proportion of resistance loss to cell voltage is not negligible because the conductivity of the water is low. Furthermore, since the electrode area effective in reaction is limited, it is preferred to heighten the conductivity of the water and this has conventionally been accomplished by dissolving a salt such as sodium sulfate, potassium sulfate, sodium chloride, or potassium chloride. However, in the case of treating a liquid containing a large amount of metal ion, such as tap water, well water, or seawater, there is a fear that a hydroxide may deposit on the cathode surface to inhibit the reaction. Use of the apparatus employing, e.g., electrodialysis as a pretreatment step for preventing the deposition results in an increase in apparatus cost. Furthermore, the necessity of periodically feeding an acid for diminishing the deposit and cleaning the cathode surface results in troublesome management of chemicals.

As described above, a technique has conventionally been extensively employed in which ozone and hydrogen peroxide are electrochemically generated, and these chemicals are used to treat a raw liquid to disinfect the liquid or modify the same in various ways. However, this conventional technique has problems in that the bactericidal activity is insufficient. Also, under alkaline conditions, which are ordinary operating conditions, metal ions which may be contained in the liquid to be treated tend to be cathodically reduced and deposited as the hydroxides on the cathode surface.

SUMMARY OF THE INVENTION

It is therefore an object of the present invention to provide a method and apparatus for water treatment in which metal deposition is less apt to occur and in which a liquid can be treated at a higher efficiency than by conventional means.

The invention provides a method of water treatment which comprises providing an electrolytic cell having an anode chamber including an anode and a cathode chamber including a cathode, supplying an oxygen-containing gas to the cathode chamber and an acid-containing liquid to be treated comprising water to the anode chamber, passing an electric current through said electrolytic cell to generate hydrogen peroxide and an oxidation product by electrolysis, and contacting the liquid to be treated with said hydrogen peroxide and oxidation product to obtain treated water.

The invention further provides an apparatus for water treatment which comprises a first electrolytic cell for producing an acid and an alkali and a second electrolytic cell for producing hydrogen peroxide and an oxidant for treating a liquid comprising water said second electrolytic cell having an inlet for receiving the liquid to be treated and an outlet for receiving treated water, said apparatus further comprising a first pipe for supplying said acid produced by said first electrolytic cell into the liquid to be treated. In yet a preferred embodiment, the apparatus further comprises a second pipe for supplying alkali produced by said first electrolytic cell to the treated water.

BRIEF DESCRIPTION OF THE DRAWINGS

FIG. 1 is a vertical sectional view illustrating an example of an electrolytic cell for water treatment for use in the method of the present invention.

FIG. 2 is a vertical sectional view illustrating an electrolytic cell for water treatment as an embodiment of the apparatus of the present invention.

FIG. 3 is a vertical sectional view illustrating another example of an electrolytic cell for water treatment for use in the method of the present invention.

DESCRIPTION OF REFERENCE NUMERALS:

1 Electrolytic cell for water treatment
2 Inlet for liquid to be treated
3 Outlet for treated water
4 Acid solution addition opening
5 Anode
6 Gas diffusion cathode
7 Collector
8 Anode chamber
9 Cathode chamber
10 Oxygen-containing gas feed opening
11 Excess oxygen gas discharge opening

DETAILED DESCRIPTION OF THE INVENTION

Examples of the liquid to be treated in the invention include water for use in cleaning electronic devices, e.g., semiconductors, drinking water such as tap water and well water, and household wastewater. The invention is applicable also to water for other various uses.

The invention attains improvements in the conventional disinfection treatment of a liquid with electrolytically yielded hydrogen proxide to enable the raw liquid to be treated more efficiently and stably.

In ordinary water electrolysis in which water and oxygen are the only feed materials, the electrode reactions are as follows. Ozone and hydrogen peroxide are materials which generate OH radicals, having oxidizing ability, and the like Anode:

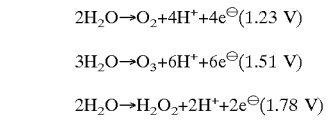

$2H_2O \rightarrow O_2 + 4H^+ + 4e^\ominus$ (1.23 V)

$3H_2O \rightarrow O_3 + 6H^+ + 6e^\ominus$ (1.51 V)

$2H_2O \rightarrow H_2O_2 + 2H^+ + 2e^\ominus$ (1.78 V)

Cathode:

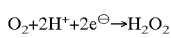

$O_2 + 2H^+ + 2e^\ominus \rightarrow H_2O_2$

When hydrochloric acid, for example, is added to the liquid being treated, hypochlorous acid generates on the anode in the following manner.

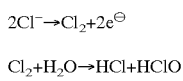

$2Cl^- \rightarrow Cl_2 + 2e^\ominus$ $Cl_2 + H_2O \rightarrow HCl + HClO$

When sulfuric acid is added, persulfuric acid generates in the following manner.

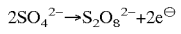

$2SO_4^{2-} \rightarrow S_2O_8^{2-} + 2e^\ominus$

On the cathode, sulfate ions may yield sulfur and hydrogen sulfide,

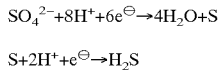

$SO_4^{2-} + 8H^+ + 6e^\ominus \rightarrow 4H_2O + S$ $S + 2H^+ + e^\ominus \rightarrow H_2S$ In the electrolysis of an aqueous solution, the anodic oxidation reactions generally yield electrolysis products from water. However, when an electrode catalyst which is highly reactive in electric discharge in water is used, there frequently are cases where the oxidation of other coexistent substances does not readily proceed.

In order for the reaction yielding hydrogen peroxide, which has the highest overvoltage, among the three anodic reactions to proceed efficiently, it is advantageous to use a catalyst such as, e.g., lead oxide, tin oxide, platinum, a DSA, or carbon. These catalysts may be used as they are in a platy form. Alternatively, one or more of these catalysts are deposited on a corrosion-resistant base, e.g., a titanium, niobium, or tantalum base, in the form of a plate, gauze, powder sinter, or metal fiber sinter by a pyrolytic method, adhesion with a resin, composite plating, or another method in a catalyst amount of from 1 to 500 g/m² to obtain an electrode. Desirable anode collector materials include valve metals such as titanium and alloys thereof. However, even when such an expensive material is used at a given electric current, it is generally consumed with the lapse of time at a rate corresponding to the current density. Although graphite and amorphous carbon materials have conventionally been used as electrode materials, they are consumed at an exceedingly high rate, especially in anodic polarization.

Besides the anode materials enumerated above, useful materials include diamond. This material has excellent thermal conductivity, optical transmission, high-temperature resistance, and acid resistance and, in particular, the electrical conductivity thereof can be controlled by doping. Due to these advantages, applications of diamond to semiconductor devices and energy converter elements are promising. Furthermore, diamond as an electrochemical electrode is stable in acidic solutions and is also useful for the reduction of $NO_x$ into ammonia and the decomposition of organic wastewaters.

This diamond catalyst is inert to water decomposition reactions. In oxidation reactions, the catalyst yields ozone and hydrogen peroxide in addition to oxygen. Because of these properties combined with its stability, the diamond electrode is a promising anode for use in the invention.

The concentration of hydrogen peroxide that is generated can be controlled in the range of from 0.1 to 1,000 ppm (1,000 ppm is 0.1 wt %) by regulating the feed amount of an oxygen containing gas, water amount, and current density. The feed amount of the oxygen-containing gas is preferably about from 1 to 2 times the theoretical oxygen amount.

Cathodes for use in the invention are not particularly limited. It is, however, most preferred to employ a cathode in the form of a gas diffusion electrode. In producing a gas diffusion electrode, an electroconductive electrode base formed from a carbon powder is used. In this case, it is desirable to form gas feed layers within the electrode so that a gas can be fed from the back side of the electrode. Preferably, a hydrophobic material and a hydrophilic material are scatteringly deposited on the cathode surface in order to smoothly feed or remove a gas or liquid used for or generated by reactions. Examples of cathode catalysts include gold and other noble metals, oxides of these, and carbonaceous materials such as graphite and diamond. Also useful are organic materials such as polyaniline and thiol compounds (SH-containing organic materials). These catalysts may be used as they are in a platy form. Alternatively, one or more of those catalysts are deposited on a corrosion resistance base, e.g., a stainless-steel, zirconium, silver, or carbon base, in the form of a plate, gauze, powder sinter, or metal fiber sinter by a pyrolytic method, adhesion with a resin, composite plating, or another method in a catalyst amount of from 1 to 1,000 g/m² to obtain an electrode. Preferred cathode collector materials include carbon, metals such as nickel and titanium, and alloys and oxides of these metals. Forming a hydrophobic sheet on the back side of the cathode, i.e., on the side opposite to the anode, is effective in controlling gas feeding to the reaction side.

This gas diffusion electrode may be disposed in close contact with a diaphragm, e.g., a cation-exchange membrane. Since the distance between the two can be minimized in this constitution, the electrolytic voltage can also be minimized. However, the resultant catholyte should be led through the gas diffusion electrode and withdrawn from the side opposite the ion-exchange membrane, and gas feeding should be conducted from the side where the liquid is withdrawn. Consequently, the above constitution results in a slightly complicated structure. The close contact between the gas diffusion electrode and the diaphragm may be accomplished by mechanically bonding the two beforehand or by applying a pressure of about from 0.1 to 30 kg/cm² during electrolysis.

Use of a catholyte having a low conductivity results in an elevated cell voltage, leading to a decrease in electrode life. In this case, from the standpoint of preventing the gas diffusion electrode from causing material pollution, a structure is most preferably employed in which the gas diffusion electrode is bonded to an ion-exchange membrane or the like.

As described above, the anode and the cathode are desirably separated from each other with a diaphragm to constitute a two-chamber type electrolytic cell for water treatment. This is intended not only to shorten the electrode-to-electrode distance, but also to produce hydrogen peroxide at a high efficiency by preventing the hydrogen peroxide which has been generated on. the cathode from moving to the anode and being decomposed by oxidation into water and oxygen. In addition, the two-chamber type cell is also effective in accelerating electrolysis even when a liquid having a low conductivity is used.

Examples of diaphragms for use in the invention include neutral diaphragms and ion-exchange membranes. The ion-exchange membranes include fluororesin membranes and hydrocarbon resin membranes. It is, however, desirable to use a fluororesin ion-exchange membrane having resistance to oxidizing agents such as hydrogen peroxide. Typical cation-exchange membranes are perfluorosulfonate polymer membranes available under the trade name of Nafion 115, 117, 315, 350, etc., produced by E. I. du Pont de Nemours & Co., Inc. A commercial ion-exchange resin can be used as a solid porous material having ion-exchange ability.

Preferred examples of the material of the electrolytic cell from the standpoints of durability and stability to hydrogen peroxide include glass-lined materials, carbon, and highly corrosion-resistant materials such as titanium, stainless steel, and PTFE resins.

Electrolysis conditions are as follows. The temperature is preferably from 5 to 60° C., and the current density is preferably from 0.1 to 100 A/dm². Although the electrode-to-electrode distance should be as small as possible so as to attain a reduced resistance loss, it is desirably about from 1 to 50 mm from the standpoint of reducing the pressure loss in a pump in water feeding to thereby maintain an even pressure distribution.

An inorganic acid is added in the invention when a liquid to be treated is supplied to an electrolytic cell having the constitution described above. The inorganic acid also functions to inhibit the deposition of a metal hydroxide on the cathode surface; the deposition is attributable to the alkalinity of the cathode surface. It is therefore desirable that an inorganic acid be added to the cathode chamber, besides being added to the anode chamber to obtain hypochlorous acid or persulfuric acid, both having a high bactericidal effect. Preferred examples of the inorganic acid include hydrochloric acid and sulfuric acid. A mixture of a salt and an acid may also be used. An acid is preferably supplied in a concentration such that the cathode surface has a pH of 9 or lower, more preferably in a concentration of from 0.01 to 100 mM (corresponding to a pH of from 1 to 5). Although the acid addition is preferably conducted before the liquid to be treated enters the electrolytic cell, the acid may be directly supplied to the electrolytic cell. As a result, the hydrogen peroxide generating in the electrolytic cell and the added inorganic acid produce a synergistic effect to thereby sufficiently disinfect the liquid which is supplied and treated. In addition, because the inside of the electrolytic cell, especially the inside of the cathode chamber, is kept acidic, not only does this prevent metal hydroxide deposition on the cathode surface, which has been a serious problem in conventional water treatment, but also the disadvantages such as, e.g., the necessity of stopping the operation for removing the hydroxide are eliminated. Although the acid addition may be conducted continuously, it may be conducted intermittently, for example, in the case where the amount of impurities contained in the liquid to be treated is small.

The following constitution is effective in saving the trouble of acid storage and management. An aqueous solution of an inorganic salt is electrolyzed in a diaphragm type electrolytic cell to synthesize an acid and an alkali. This acid, like the inorganic acid, is added to the liquid to be treated, while the alkali is added to the treated liquid downstream from the outlet of the diaphragm type electrolytic cell. As a result, not only the inside of the electrolytic cell is kept acidic to produce the effects described above, but also the treated liquid discharged from the electrolytic cell is kept neutral or nearly neutral. Consequently, a treated liquid most suitable for ordinary applications is obtained. The diaphragm type electrolytic cell may be a conventionally known one, and may be either of the two-chamber type having one diaphragm and the three-chamber type which has two diaphragms, i.e., which has an anion-exchange membrane interposed between an intermediate chamber and an anode chamber and a cation-exchange membrane interposed between the intermediate chamber and a cathode chamber. Examples of the inorganic salt to be added include sodium sulfate, potassium sulfate, sodium chloride, and potassium chloride. When an aqueous sodium chloride solution is supplied to the intermediate chamber, an acid and an alkali are obtained by the following reaction.

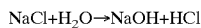

$NaCl+H_2O \rightarrow NaOH+HCl$

The acid which has generated in the anode chamber is added to the liquid to be treated, preferably at the inlet of the electrolytic cell or upstream from the inlet.

Another technique that can be used for preventing the deposition of a metal hydroxide is to remove multivalent metal ions with a conventionally known chelate resin. This is a technique of separating/recovering multivalent ions based on differences in chelation selectivity among ions. For example, when a chelate resin which has been converted to a sodium form is used, it liberates sodium ions upon displacement to enable the liquid to maintain conductivity. This is advantageous to the subsequent step of electrolysis. After use, the chelate resin can recover its performance through treatment with an acid and an alkali.

DESCRIPTION OF THE PREFERRED EMBODIMENTS

Preferred embodiments of the invention will be explained next. FIG. 1 is a vertical sectional view illustrating an example of an electrolytic cell for water treatment for use in the method of the invention.

This electrolytic cell for water treatment 1 has an inlet for liquid to be treated 2 at the center of the bottom plate and further has an outlet for treated water 3 at the center of the top plate. The inlet for liquid to be treated 2 has a branch, which constitutes an acid solution addition opening 4. Inside the electrolytic cell 1 are disposed an anode 5 consisting of a porous insoluble electrode and, apart from the anode 5, a gas diffusion cathode 6 formed by kneading carbon together with a water-repellent resin and molding the mixture. Electricity is supplied to the gas diffusion cathode 6 through a collector 7 bonded to the back side thereof. The electrolytic cell 1 is partitioned into an anode chamber 8 and a cathode chamber 9 with the gas diffusion cathode 6. The cathode chamber 9 has an oxygen-containing gas feed opening 10 and an excess oxygen gas discharge opening 11 in the top plate and the bottom plate, respectively.

A liquid to be treated, e.g., tap water, is supplied to the electrolytic cell 1, which has the constitution described above, through the inlet for liquid to be treated 2, while feeding an oxygen-containing gas, e.g., air or oxygen, through the oxygen-containing gas feed opening 10 of the electrolytic cell 1. Simultaneously therewith, hydrochloric acid or sulfuric acid is added to the raw liquid through the acid solution addition opening 4. The acid-containing raw liquid to be treated enters the electrolytic cell 1 and contacts the anode 5, where the acid is oxidized into hypochlorite ions or persulfate ions. As a result, the raw liquid is treated with these ions, which have a higher oxidizing ability than the acid itself which has been supplied to the raw material. On the other hand, on the cathode 6 side of the electrolytic cell 1, the oxygen-containing gas which is being supplied to the cathode chamber is reduced to yield hydrogen peroxide, and this hydrogen peroxide is also used to treat the raw liquid.

The raw liquid to be treated is thus disinfected by both hydrogen peroxide and acid ions, whereby the raw liquid is electrochemically treated at a higher efficiency than in conventional treatments. Furthermore, since the acid is present also around the cathode in the electrolytic cell, this inhibits metal ions from being reduced and deposited on the cathode surface. Consequently, the function of the cathode is less apt to be impaired and stable operation is possible over a long period of time.

FIG. 2 is a vertical sectional view illustrating an electrolytic cell for water treatment as an embodiment of the apparatus of the invention.

This electrolytic cell for water treatment 1A has the same constitution as the cell shown in FIG. 1, except that an ion-exchange membrane 12 is disposed in close contact with the cathode 6 on its side facing the anode 5 and that an alkali solution addition opening, which will be described below, is provided. A further explanation on the constitution of the electrolytic cell of FIG. 2 is hence omitted.

A diaphragm type electrolytic cell 13 is partitioned with an anion-exchange membrane 14 and a cation-exchange membrane 15 into an anode chamber 16, an intermediate chamber 17, and a cathode chamber 18. The anode chamber 16 and the cathode chamber 18 respectively have, disposed therein, a porous anode 19 and a porous cathode 20. The intermediate chamber 17 has an inorganic-salt solution feed opening 21 formed in the bottom plate thereof, and the anode chamber top plate has an acid solution circulation opening 22 formed therein. The intermediate-chamber top plate has a salt solution discharge opening 23 formed therein, and the cathode chamber top plate has an alkali solution circulation opening 24 formed therein.

The acid ions, e.g., hypochlorite ions, generated in the anode chamber 16 of the diaphragm type electrolytic cell 13 are circulated from the acid solution circulation opening 22 to the acid solution addition opening 4 of the electrolytic cell for water treatment 1A and added to the raw liquid. On the other hand, the alkali e.g., hydroxyl ions, generated in the cathode chamber 18 of the diaphragm type electrolytic cell 13 is circulated from the alkali solution circulation opening 24 to the alkali solution addition opening 25 branching from the outlet for treated water 3 of the electrolytic cell for water treatment 1A. The alkali thus neutralizes the treated water, which is acidic due to the acid addition thereto through the acid solution addition opening 4.

FIG. 3 is a vertical sectional view illustrating another example of an electrolytic cell for water treatment for use in the method of the invention. The electrolytic cell for water treatment 1 shown in FIG. 3 has the same constitution as the electrolytic cell shown in FIG. 1, except that the acid solution addition opening 4 has been removed. A further explanation of the constitution thereof is hence omitted.

The electrolytic cell for water treatment 1 is connected, upstream from the inlet for liquid to be treated 2, to a cylindrical chelating column 28 which has upper and lower perforated plates 26 and in which the space between the two plates 26 is filled with a granular chelate resin 27. A raw liquid to be treated is introduced into the chelating column 28 through inlet 29 to contact the chelate resin 27. The raw liquid is deionized by the chelate resin 27, removed from the chelating column 28 through an outlet 30, and then supplied to the electrolytic cell for water treatment 1 through the inlet for liquid to be treated 2. The raw liquid is then treated in the manner described above.

In this apparatus, various ions present in the liquid to be treated are removed by the chelating column 28 before the raw water is treated in the electrolytic cell 1. Consequently, the treated water removed from the electrolytic cell 1 has a greatly improved purity. Furthermore, since the raw liquid which flows into the electrolytic cell 1 has a reduced impurity content, the corrosion of members inside the electrolytic cell, including the electrodes, is reduced so that a prolonged operating life can be attained.

EXAMPLES

Examples of methods of treating a raw liquid using apparatus for water treatment according to the invention will be described below. However, these Examples should not be construed as limiting the scope of the invention.

Example 1

Iridium oxide ($IrO_2$) catalyst was deposited on a perforated titanium plate by a pyrolytic method in an amount of 10 g/m$^2$ to obtain an insoluble electrode for use as an anode.

A graphite powder (TGP-2, manufactured by Tokai Carbon Co., Ltd.) as a catalyst was kneaded together with a PTFE resin, and the mixture was burned at 330° C. to obtain a 0.5 mm-thick sheet for use as an oxygen gas electrode. The anode and the cathode were disposed apart from each other at a distance of 5 mm, without disposing a diaphragm, to fabricate an electrolytic cell for water treatment having the constitution shown in FIG. 1 and having an effective electrolysis area of 20 cm$^2$.

Tap water (liquid to be treated) was fed to the space between the anode and cathode of the electrolytic cell at a rate of 1,000 ml/min and, simultaneously therewith, air was fed to the cathode-side gas chamber at a rate of 20 ml/min. Prior to the inlet of the electrolytic cell, 1 M hydrochloric acid was added to the tap water at a rate of 1 ml/min to adjust the pH of the water to 3. A current of 2 A was passed through the electrolytic cell at a temperature of 25° C. As a result, the cell voltage was 14 V, and 3 ppm hypochlorous acid and 10 ppm hydrogen peroxide were obtained through the outlet at current efficiencies of about 10% and about 50%, respectively. This electrolytic cell was subjected to 500-hour continuous operation. As a result, the electrolysis could be continued although the current efficiencies for the two electrolysis products decreased to 8% and 40%, respectively.

Example 2

The same electrolytic cell for water treatment as in Example 1 was fabricated, except that a perforated titanium anode on which an electroconductive diamond catalyst (doped with boron in a concentration of 1,000 ppm) had been deposited was used as an anode.

Tap water was supplied to the space between the anode and cathode of the electrolytic cell at a rate of 1,000 ml/min and, simultaneously therewith, air was supplied to the cathode-side gas chamber at a rate of 10 ml/min. Prior to the inlet of the electrolytic cell, 1 M hydrochloric acid was intermittently added to the tap water at a rate of 1 ml/min. A current of 2 A was passed through the electrolytic cell at a temperature of 25° C. As a result, the cell voltage was 18 V, and 3 ppm hypochlorous acid and 10 ppm hydrogen peroxide were obtained through the outlet at current efficiencies of about 10% and about 50%, respectively. Furthermore, it was ascertained by ultraviolet absorption spectrometry that ozonized water having an ozone concentration of 0.3 ppm was obtained at a current efficiency of 1%.

Example 3

A three-chamber type electrolytic cell having the constitution shown in FIG. 2 was fabricated using anion-exchange membrane AMS and cation-exchange membrane CMS, both manufactured by Tokuyama Co., Ltd. The electrolysis area was 20 cm$^2$. 5 M aqueous sodium sulfate solution was supplied to the intermediate chamber of this electrolytic cell, and electrolysis was conducted at 30 A/dm$^2$. As a result, 1 M sulfuric acid and 1 M aqueous sodium hydroxide solution were obtained through the anode chamber outlet and the cathode chamber outlet, respectively, each at a current efficiency of 50%.

The same electrolytic cell for water treatment as in Example 2 was fabricated, which had no diaphragm. Air was supplied to the gas chamber at a rate of 20 ml/min, while a liquid to be treated was supplied to the space between the anode and cathode at a rate of 1,000 ml/min. Simultaneously therewith, the 1 M sulfuric acid was intermittently added to the raw liquid prior to the inlet of this electrolytic cell at a rate of 1 ml/min. A current of 2 A was passed through the electrolytic cell at a temperature of 25° C. As a result, the cell voltage was 16 V, and 1 ppm persulfuric acid and 10 ppm hydrogen peroxide were obtained through the outlet at current efficiencies of about 1% and about 50%, respectively. Furthermore, it was ascertained by ultraviolet absorption spectrometry that ozonized water having an ozone concentration of 0.1 ppm was obtained at a current efficiency of 0.3%.

Example 4

The same electrolytic cell for water treatment as in Example 1 was fabricated, except that a diaphragm (Yumicron, manufactured by Yuasa Co., Ltd.) was interposed between the anode and cathode. A current of 2 A was passed through the electrolytic cell at a temperature of 25°

C. As a result, the cell voltage was 15 V, and 5 ppm hypochlorous acid and 12 ppm hydrogen peroxide were obtained through the outlet at current efficiencies of about 15% and about 60%, respectively.

Comparative Example 1

The same electrolytic cell as in Example 1 was fabricated. This cell was used to conduct electrolysis under the same conditions as in Example 1, except that hydrochloric acid was not added. As a result, the initial cell voltage was 50 V, and 3 ppm hypochlorous acid and 10 ppm hydrogen peroxide were obtained through the outlet at current efficiencies of about 10% and about 50%, respectively. However, when this cell was operated for 20 hours, the current efficiencies gradually decreased to 5% and 20%, respectively, and the voltage reached 60 V. After the electrolysis, the cathode surface was examined. As a result, a deposit of calcium and magnesium compounds was observed.

Example 5

The same electrolytic cell for water treatment as in Example 1 was fabricated, except that a perforated titanium anode on which an electroconductive diamond catalyst (doped with boron in a concentration of 1,000 ppm) had been deposited was used as an anode. A sodium-form chelate resin (200 ml) was interposed prior to the inlet of the electrolytic cell, and tap water was passed therethrough at a rate of 1,000 ml/min. A current of 0.2 A was passed through the electrolytic cell at a temperature of 25° C. As a result, the cell voltage was 55 V, and 0.1 ppm hypochlorous acid and 5 ppm hydrogen peroxide were obtained through the outlet at current efficiencies of about 3% and about 25%, respectively. Furthermore, it was ascertained by ultraviolet absorption spectrometry that ozonized water having an ozone concentration of 0.1 ppm was obtained at an efficiency of 0.3%. After the electrolysis, the cathode surface was examined. As a result, no deposition of calcium or magnesium was observed.

The method of water treatment of the invention comprises applying a voltage to an acid-containing liquid to be treated, while feeding an oxygen-containing gas to the cathode, to thereby yield hydrogen peroxide and an oxidation product and electrochemically treating the liquid with both of the hydrogen peroxide and the oxidation product.

According to the method of the invention, because the liquid to be treated is electrochemically treated with two chemicals, namely, hydrogen peroxide and an oxidation product such as, e.g., hypochlorous acid, the treatment of the raw liquid can be conducted more efficiently. Adding the oxidation product also to the cathode chamber is effective in inhibiting metal ions from being reduced and deposited as a metal hydroxide, whereby the cell can be operated over a long period of time without necessitating cathode replacement, etc.

Furthermore, since an inorganic acid, which is an electrolyte, is used as a material for generating the oxidation product, the addition thereof is effective in lowering the cell voltage.

The oxidation product can be synthesized by adding an inorganic acid to the liquid to be treated and electrolyzing the inorganic acid. Since the thus-synthesized oxidation product, e.g., hypochlorous acid or persulfuric acid, has high bactericidal activity, use thereof in combination with hydrogen peroxide brings about a synergistic effect.

In the invention, a gas diffusion electrode and an electroconductive diamond can be used as a cathode and an anode, respectively. The gas diffusion electrode is effective in facilitating gas feeding and discharge to thereby attain a heightened reaction efficiency, while the electroconductive diamond has high activity in water treatment and is effective in preventing a decrease in efficiency caused by impurity deposition on the anode surface.

When the liquid to be treated is deionized with a chelate resin or the like before being supplied to the electrolytic cell, not only a treated liquid having an improved purity can be obtained, but also the corrosion of electrolytic cell members, e.g., the electrodes, can be inhibited to attain prolonged operating life.

The apparatus for water treatment of the invention comprises (i) a diaphragm type electrolytic cell in which water containing an inorganic salt is electrolyzed to synthesize an acid and an alkali, and (ii) an electrolytic cell for water treatment in which a liquid to be treated is fed thereto through an inlet. The liquid to be treated and is electrochemically treated with hydrogen peroxide that is generated by feeding an oxygen-containing gas to the cathode, and the resultant treated water is removed through an outlet for treated water. The acid solution and the alkali solution both obtained in the diaphragm type electrolytic cell are supplied to the inlet for liquid to be treated and the outlet for treated water, respectively.

Use of this apparatus has is advantageous in that the acid obtained from the diaphragm type electrolytic cell can be used for the production of an oxidation product, and the alkali obtained simultaneously with the acid can be used to neutralize the acidic treated liquid obtained in the electrolytic cell for water treatment. Thus, both contribute to the maintenance of treated-water quality.

While the invention has been described in detail and with reference to specific embodiments thereof, it will be apparent to one skilled in the art that various changes and modifications can be made therein without departing from the spirit and scope thereof.

What is claimed is:

1. A method of water treatment which comprises electrolyzing an acid-containing liquid to be treated comprising water in the presence of an oxygen-containing gas to generate hydrogen peroxide and an oxidation product, and contacting the liquid to be treated with said hydrogen peroxide and oxidation product to obtain treated water.

2. A method of water treatment which comprises providing an electrolytic cell having an anode chamber including an anode and a cathode chamber including a cathode, supplying an oxygen-containing gas to the cathode chamber and an acid-containing liquid to be treated comprising water to the anode chamber, passing an electric current through said electrolytic cell to generate hydrogen peroxide and an oxidation product by electrolysis, and contacting the liquid to be treated with said hydrogen peroxide and oxidation product to obtain treated water.

3. The method as claimed in claim 2, which comprises adding an acid to a liquid to be treated comprising water to prepare the acid-containing liquid to be treated comprising water.

4. The method as claimed in claim 2, which comprises adding hydrochloric acid to a liquid to be treated comprising water to prepare the acid-containing liquid to be treated comprising water and said oxidation product comprises hydrochlorous acid.

5. The method as claimed in claim 2, wherein the cathode comprises a gas diffusion electrode and anode comprises an electroconductive diamond.

6. The method a s claimed in claim 2, wherein said electrolytic cell comprises a gas diffusion cathode which partitions the electrolytic cell into a cathode chamber and an anode chamber including an anode disposed apart from said gas diffusion cathode.

7. The method as claimed in claim 6, which comprises passing an electric current through said electrolytic cell to generate hydrogen peroxide at said gas diffusion cathode and an oxidation product at said anode.

8. The method as claimed in claim 2, which comprises removing multivalent cations from said liquid to be treated prior to electrolysis.

9. The method as claimed in claim 8, which comprising removing said multivalent cations by means of a chelate resin.

10. A method of water treatment which comprises electrolyzing water containing an inorganic salt in a first electrolytic cell to produce an acid and an alkali, adding the acid thus obtained to a liquid to be treated comprising water to prepare an acid-containing liquid to be treated, providing a second electrolytic cell comprising a gas diffusion cathode which partitions the second electrolytic cell into a cathode chamber and an anode chamber including an anode, supplying an oxygen-containing gas to the cathode and said acid-containing liquid to be treated to the anode chamber, electrolyzing the acid-containing liquid to be treated in said second electrolytic cell to generate hydrogen peroxide and an oxidation product by electrolysis, and contacting the liquid to be treated with said hydrogen peroxide and oxidation product to obtain treated water.

11. The method of water treatment as claimed in claim 10, wherein the anode is disposed apart from said gas diffusion cathode.

12. The method of water treatment as claimed in claim 10, which comprises neutralizing the treated water with alkali produced by said first electrolytic cell.

13. The method as claimed in claim 12, wherein said first electrolytic cell comprises an anion-exchange membrane and a cation-exchange membrane which partition the electrolytic cell into an node chamber including an anode, an intermediate chamber and a cathode chamber including a cathode, said intermediate chamber having an inorganic-salt solution feed inlet and a salt solution discharge outlet, said anode chamber having an acid solution outlet for adding acid to the liquid to be treated and said cathode chamber having an alkali solution outlet for adding alkali to neutralize the treated water.

14. The method as claimed in claim 10, which comprises removing multivalent cations from said liquid to be treated prior to electrolysis.

15. The method as claimed in claim 14, which comprises removing said multivalent cations by means of a chelate resin.

16. The method as claimed in claim 10, wherein the anode comprises an electroconductive diamond.

17. An apparatus for water treatment which comprises a first electrolytic cell for producing an acid and an alkali and a second electrolytic cell for producing hydrogen peroxide and an oxidant for treating a liquid comprising water, said second electrolytic cell having an inlet for receiving the liquid to be treated and an outlet for recovering treated water, said apparatus further comprising a first pipe for supplying said acid produced by said first electrolytic cell into the liquid to be treated.

18. The apparatus as claimed in claim 17, further comprising a second pipe for supplying alkali produced by said first electrolytic cell to the treated water.

19. The apparatus as claimed in claim 17, wherein the first electrolytic cell comprises an anion-exchange membrane and a cation-exchange membrane which partition the electrolytic cell into an anode chamber including anode, an intermediate chamber and a cathode chamber including a cathode, said intermediate chamber having an inorganic-salt solution feed inlet and a salt solution discharge outlet, said anode chamber having an acid solution outlet for supplying acid to the liquid to be treated and said cathode chamber having an alkali solution outlet for supplying alkali to the treated water.

20. The apparatus as claimed in claim 19, wherein the anode comprises an electroconductive diamond.

21. The apparatus as claimed in claim 17, wherein said second electrolytic cell comprises a cathode chamber having an inlet for supplying an oxygen-containing gas to the cathode chamber.

22. The apparatus as claimed in claim 17, wherein said second electrolytic cell comprises a gas diffusion cathode which partitions the electrolytic cell into a cathode chamber and an anode chamber including an anode disposed apart from said gas diffusion cathode, said anode having an inlet for receiving the liquid to be treated and an outlet for receiving treated water, said cathode chamber having an inlet for supplying an oxygen-containing gas to the cathode chamber and an excess gas discharge outlet for discharging excess gas from the cathode chamber.

* * * * *